Figure 1:
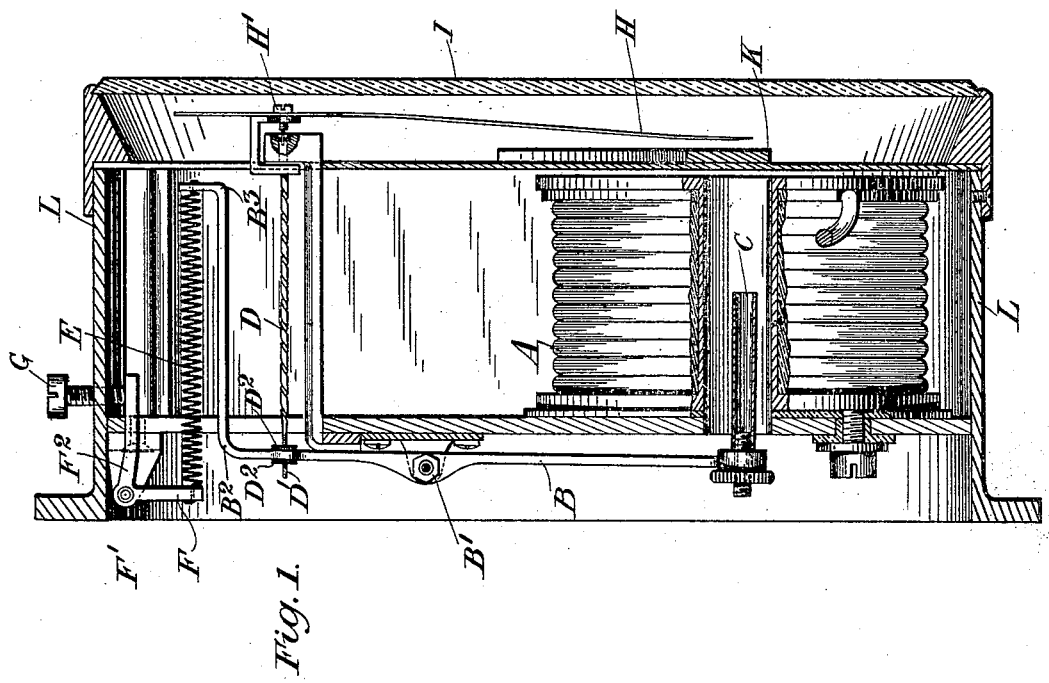

(No Model.) 2 Sheets—Sheet 1.

J. PERRY & C. E. HOLLAND.
AMMETER AND VOLTMETER.

No. 511,791. Patented Jan. 2, 1894.

Witnesses
A. N. Dobson,
Robt. M. P. McIlans.

Inventors
John Perry
Charles Edward Holland,
By Foster Freeman
Attorneys.

UNITED STATES PATENT OFFICE.

JOHN PERRY AND CHARLES EDWARD HOLLAND, OF LONDON, ENGLAND.

AMMETER AND VOLTMETER.

SPECIFICATION forming part of Letters Patent No. 511,791, dated January 2, 1894.

Application filed April 6, 1893. Serial No. 469,312. (No model.) Patented in England May 19, 1892, No. 9,515.

*To all whom it may concern:*

Be it known that we, JOHN PERRY and CHARLES EDWARD HOLLAND, subjects of the Queen of England, residing at London, England, have invented certain new and useful Improvements in Ammeters and Voltmeters, (for which we have received Letters Patent in Great Britain, No. 9,515, dated May 19, 1892,) of which the following is a specification.

The object of our present invention is to so adapt the well-known Ayrton and Perry magnifying spring ammeters and voltmeters that they may have a vertical or other dial so that they may be suitable for use fixed on a wall or switch board in any position. In one form of these instruments there is a coil of wire wound on a vertical tube; a piece of soft iron is attracted into this coil when a current flows through the wire, and the movement of this soft iron is opposed by an Ayrton and Perry magnifying spring fixed to it at the lower end. The core rotates as it ascends and the amount of this rotation is indicated on a horizontal scale by a pointer attached to the upper end of the core. In another modification the piece of soft iron is slung by wires or flexible strips, one end of the spring being fixed to the iron, the other being pivoted and having a pointer attached rotating in a vertical plane.

The present invention is an improvement on these. We fix the piece of soft iron to one end of a small lever, which is pivoted in such a way that the iron may be attracted into a coil of wire when current flows through the same, and we fix one end of the spring to the lever at some point. If the instrument is to have a vertical scale this point is so arranged that it has approximately a horizontal motion; the other end of the spring is pivoted and has a pointer attached to it. The axis of the spring is horizontal and consequently the pointer moves in a vertical plane and the amount of its rotation may be observed on a vertical scale. The small lever may be of any suitable shape and the axis of the coil in any direction; a compact and convenient instrument is obtained by having the coil with its axis horizontal, and a straight lever. We also find it convenient to fix to some point on the lever a secondary spring the tension in which can be adjusted by means of a screw or other appliance fixed to the case of the instrument. By means of this we are enabled to adjust the pointer accurately to zero without disturbing the position of the instrument. In order to increase the attraction of the core, we sometimes surround the coil with iron, with the exception of the central tube on which the coil is wound; sometimes making the end cheeks of the coil of iron plates and placing an iron tube round the outside of the coil.

Figure 2:
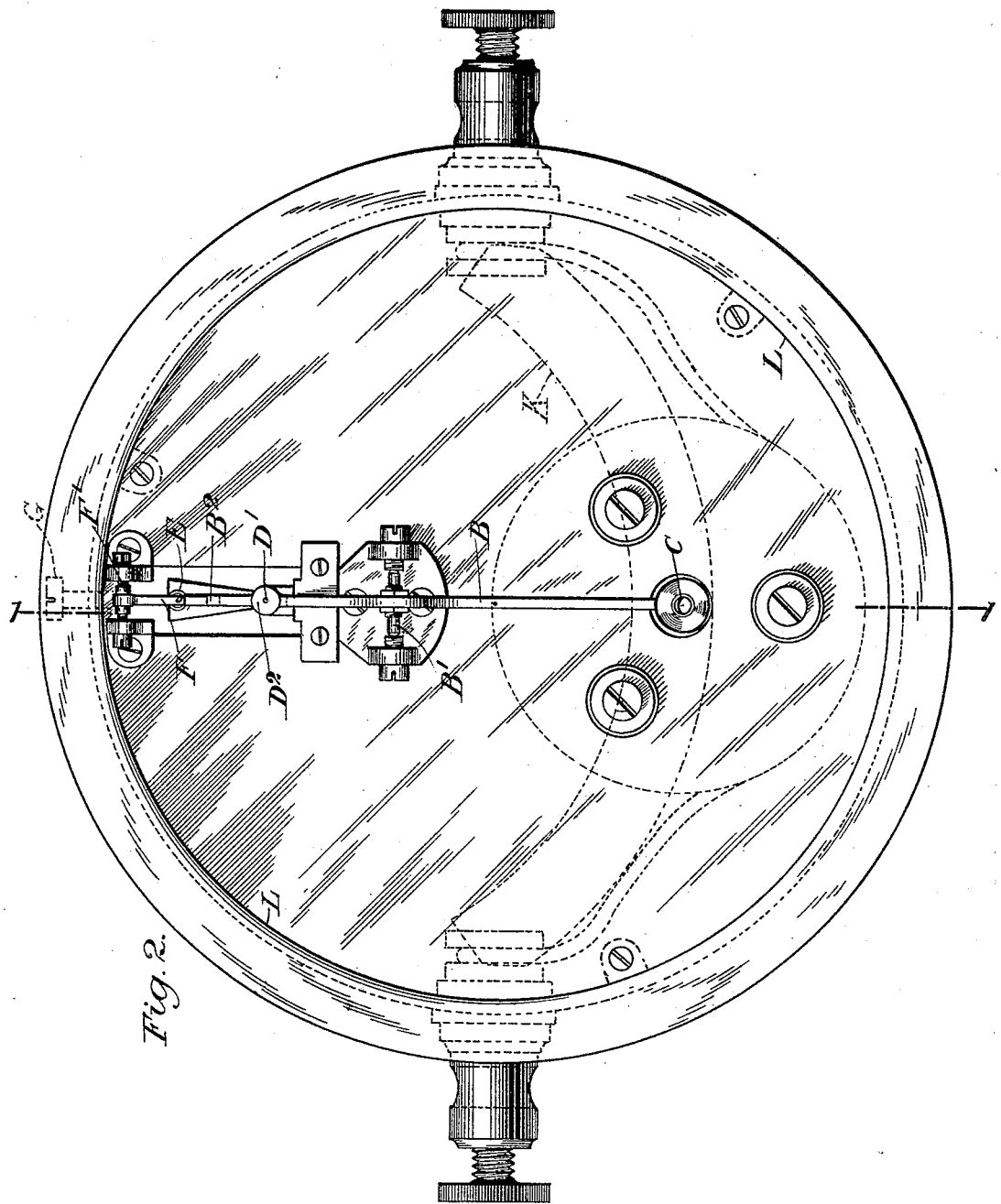

Figure 1 of the accompanying drawings will serve to illustrate this invention and is a section on the line 1 1 of Fig. 2 through an instrument arranged within a circular casing and having for convenience a circular face and glass with a scale over which the index finger travels which is formed to the arc of a circle having the pivot point of the index finger for its center. Fig. 2 is a back view of the same instrument.

Like letters represent like parts in both figures.

A is the coil, B the lever pivoted at B' and carrying the piece of soft iron C which enters the central recess in the coil A.

D is the "magnifying springs" secured at D' to the lever B through which it passes the end of the spring being screw threaded and carrying nuts $D^2$ by which the spring is secured in the lever; any other suitable rigid connection may however be adopted. The lever B is cranked at $B^2$ and again at $B^3$ where it is connected with the spring E the other end of which is connected to the arm F of a bell crank lever pivoted at F' and having its other arm $F^2$ in contact with the regulating screw G which takes its bearing through the wall of the metal or other case L. By this arrangement the index hand H can be readily adjusted to zero by turning the screw G in so as to force the lever arm $F^2$ inward and so put slight tension upon the spring E, or withdrawing it so as to allow the arm $F^2$ to move nearer to the case under the influence of the spring E.

The operation of the magnifying spring D need not be described here beyond the statement that a very slight movement of the end D' in the direction of the axis of the spring D by the lever B will cause the index finger H to travel over the whole of its course across the face of the apparatus. This index finger is pivoted at H' to the end of the magnifying spring D in such a manner that it partakes of the circular movement imparted to this end of the spring (whose other end is not allowed to turn in the lever B) by the tension placed upon it by the movement of the lever B.

I is the glass face and K is the scale over which the finger H travels.

We claim—

1. In an electric measuring instrument such as described, the combination with a pivoted lever of a magnifying spring connected to the lever at one end of its pivot point, an index hand connected to the magnifying spring, a coil, and a piece of soft iron connected to the other end of the pivoted lever and arranged to be operated by the coil on the passage of an electric current therethrough, substantially as described.

2. In a measuring instrument such as described, the combination with the magnifying spring, the lever, and the coil arranged to operate the spring, of a regulating or balancing spring for the lever, substantially as described.

3. In a measuring instrument such as described, the combination with the magnifying spring, the lever, a piece of soft iron, the coil and index-hand, of a regulating spring attached to the lever, and means for adjusting the tension of said regulating spring, substantially as described.

4. In a measuring instrument such as described, the combination with the magnifying spring, the lever, the soft iron core and the coil, of a regulating spring, a bell-crank-lever connected to the spring, and an adjusting screw connected to the lever, substantially as described.

In testimony whereof we have hereto set our hands in the presence of two subscribing witnesses.

JOHN PERRY.
CHARLES EDWARD HOLLAND.

Witnesses:
GEO. J. B. FRANKLIN,
W. J. NORWOOD.